9612X

F. W. Whitley,

Window.

Patented Apr. 21. 1836.

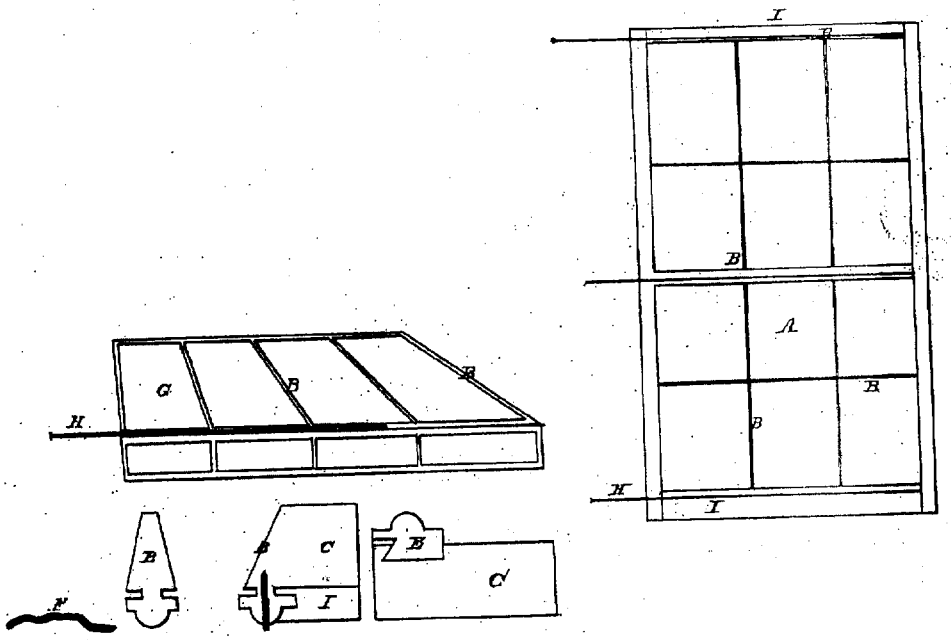

A. Finished sash.
B.B.&. Groved bars in which the glass is set.
C. The end of the top and bottom rail.
E. Is a moving bar inserted in dovetailed rail.
F. Cotton or other wadding to make the bars air tight.
G. Horizontal sash or show case.
H. Sliding bar.
I. Shifting top and bottom rail to be used when the dovetailed bar E is not so admissible.

N. PETERS, PHOTO-LITHOGRAPHER, WASHINGTON, D. C.

9612X

Apr 21, 1836

Thomas W. Whitley. Essex, [illegible]

Letters Patent.

The schedule referred to in these Letters Patent and
making part of the same, containing a description in the words
of the said Thomas W. Whitley himself of his "improvement in
making sashes and Glass cases."

To all to whom these presents shall come.
Be it known that I, Thomas W. Whitley of the Township of
Paterson County of Essex and State of New-Jersey, have inven-
ted a new and useful improvement in the Manufacture of sashes
and Glass cases, and the following is an exact description of the
said improvement invented by me, In the drawing accompany-
ing this Specification, A is a finished sash, B.B.B.B. are grooved
bars into which the glass is put. CC are end views of the bottom
and top rails of the improved sash through which in the dovetail
groove a sliding bar 6 is made to slide or take out to admit the
glass and then close again. F is a bit of Belfast twist or other
material to be inserted in the groove to make the glass air tight
D. is a sash or show case frame horizontally placed, con-
structed in like manner to the perpendicular sash. [illegible] H is a
representation of the sliding or lifting bars partly drawn out
to show in what manner the glass is introduced into the
sash. I is a shifting or portable top and bottom rail to be used
when the dovetailed bar is not so admissible.

What I claim as my own invention and not previously known
is, the slide and double rail at the top and bottom of the sash, and
the insertion of a cotton or linen thread between the wood and glass
to make it air tight.

Witnesses
Elisha B. Clark
Henry Whitely
[illegible]

Thomas W. Whitley